Dec. 15, 1931. W. M. LITTLE ET AL 1,836,674
OIL AND WATER SEPARATOR
Filed Sept. 12, 1928
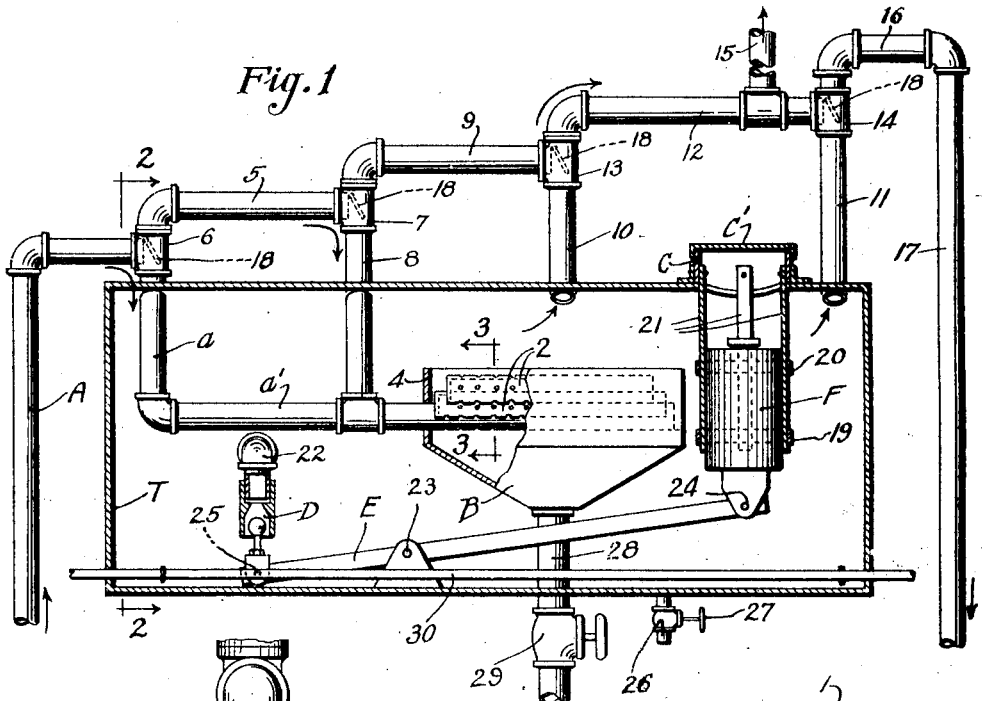
Fig.1
Fig.3
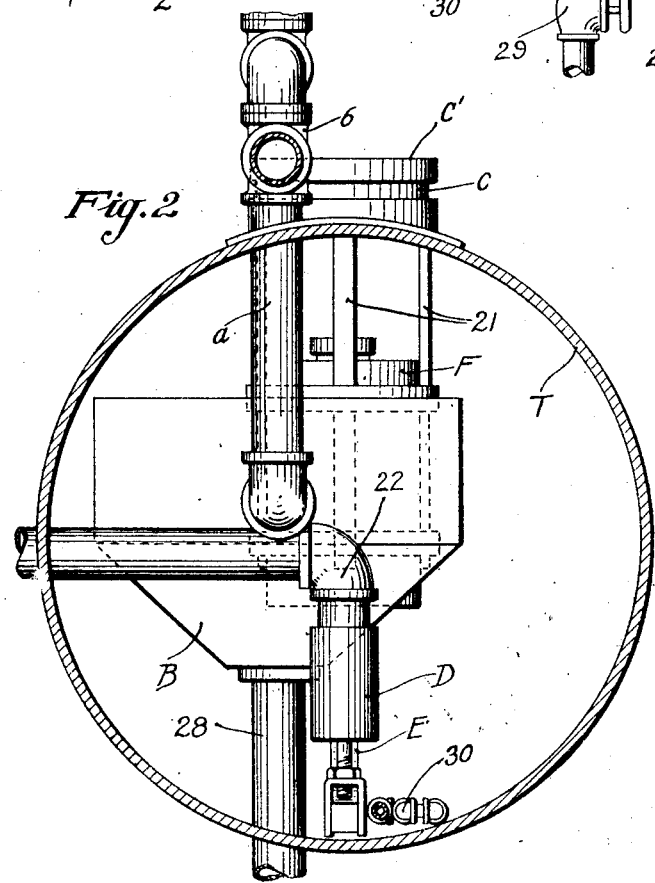
Fig.2
INVENTORS
William M. Little
Jessie L. Sherman
BY
ATTORNEYS Patented Dec. 15, 1931

1,836,674

UNITED STATES PATENT OFFICE

WILLIAM M. LITTLE, OF NORPHLET, ARKANSAS, AND JESSIE L. SHERMAN, OF HUNTINGTON BEACH, CALIFORNIA

OIL AND WATER SEPARATOR

Application filed September 12, 1928. Serial No. 305,360.

This invention relates to and has for a main object the provision of means for separating water, sand and other waste products and foreign elements from crude oil which is pumped from wells.

Our invention contemplates a comprehensive system and arrangement of parts which will effectively emulsify or increase emulsification of the products of a well and treat said products by agitation, pressure, gravity and/or heat whereby the water and other foreign elements may be separately disposed of, the substantially purified oil discharged for use, and any gas present in the oil incidentally vented to the atmosphere.

With the above and other objects in view our invention consists of the novel features of construction and the combination and arrangement of parts, substantially as shown in the drawings and more fully described hereinafter.

In said drawings:

Fig. 1 is a longitudinal section through the separator showing the several elements thereof in operative relation;

Fig. 2 is a sectional elevation of the same on line 2—2 of Fig. 1;

Fig. 3 is an enlarged transverse section of the oil discharge pipes.

Referring to Fig. 1, the separator includes a tank T which is substantially elongated and is of cylindrical form. Oil from the well is pumped into the tank through a pipe A which has a section $a$ depending into the tank and a continuing section $a'$ which is horizontally disposed about in the center of the tank. The inlet section $a'$ has several series of perforations 1, 1, etc., of which one row at least is formed in the bottom of the pipe, through which sand and grit may be discharged into a funnel like receptacle B at the bottom of the tank. A pair or more of parallel sections 2, 2, are attached to the section $a'$ by welding, or otherwise, at their cut-away edges, as shown in Fig. 3, and are provided with perforations 3, 3, etc., at such edges so as to provide means for discharging the sand therefrom into receptacle B. The perforations 1, 1, etc. are also provided in the pipes 2, 2, and the ends thereof are closed so that the oil discharged through the perforations of the pipe $a'$ into the pipes 2, 2, will be discharged in like manner through the perforations 1, 1, etc. of the pipes 2, 2 into tank T.

The pipe A has a branch 5 which connects at a T 6 with the section $a$, and said branch also connects at a similar T 7 with a depending section 8 and a horizontal branch 9. Other vertical pipes 10 and 11 depend into the tank T but do not connect with the inlet pipe A or its branches. Pipes 10 and 11 are connected, however, by means of a horizontal pipe 12 and T fittings 13 and 14 and the T 13 also connects with the section 9. A gas and air vent 15 may be provided in the pipe 12 and extended substantially above the level of the horizontal section 16 of an oil discharge pipe 17.

It will be noted that the pipe sections 5, 9, 12 and 16 are arranged at gradually higher elevations above the tank T in stair step fashion and the T's 6, 7, 13 and 14 are internally provided with baffles 18, 18, etc., particularly the T's 6 and 7, for diverting the rush of oil from the inlet pipe A downwardly into the tank T and permitting any attendant gaseous matter to rise through the pipes 5, 9 and 12 to the vent 15, from which it may escape to the atmosphere.

Water, or other liquids which may be present in the products of the well accumulate in the bottom of the tank T and rise to a level approximately flush with the axis of the pipe $a'$, and the oil being lighter than water will fill the upper portion of the tank and the pipes 8, 9, 10, 11 and 12, due to the pressure in the inlet pipe and is adapted to be discharged, after its purification and the separation of the water and sand therefrom, through the outlet pipe 17 for further disposition and use.

A hollow float F is provided in the tank T of sufficient size and weight that it will sink in oil but float in water. Said float is disposed beneath a manhole C formed on the top of tank T and covered by a suitable cover C', by means of which access may be had to the interior of the tank for installing and removing the float. The float is guided in its vertical movement by means of a pair of rings 19 and 20 which are attached to depending bars 21, 21, etc. secured at their upper ends to the inner periphery of the manhole C. The float is normally supported slightly above a water discharge valve D which connects with a pipe extended outwardly or upwardly from the tank T. A lever E fulcrummed at 23 in the tank is pivotally connected at points 24 and 25, respectively, with the float and valve D.

Valve D is positioned at an elevation in the tank below the lowest possible level of the water, and float F operates to maintain a substantially constant level of the water in the tank by opening and closing the valve as the volume of water increases and decreases, respectively. When the valve D is open the water is discharged through pipe 22 by the pressure above and on the body of water. The contents of the tank T may be drained off for the purpose of cleaning, or otherwise, by means of a drain pipe 26 and a valve 27 at the bottom of the tank. Likewise the contents of the sand receptacle B may be drained by means of a pipe 28 and valve 29.

In order to facilitate the liberation of gas from the well products in the tank T we may provide a steam coil, or series of pipe sections, as at 30, preferably in the bottom of the tank and submerged in the water, by means of which the contents of the tank may be heated to a suitable temperature. Such means may be suitably connected with a source of steam supply. Electrical heating means may be employed in lieu of the steam heating means, if desired.

Now, in operation, the products of the well are pumped under pressure to the tank T through pipe A mainly, but some of the oil will find its way to the tank through the pipes 5 and 8, as well. The emulsified oil is discharged through the peripheral orifices 1, 1, etc. of the pipes $a'$, and 2, 2 into the tank until the tank, together with the vertical pipes 10 and 11 are filled. The water mixed with the oil settles in the bottom of the tank and rises to a predetermined level with the oil supported thereon, and the float F rises with the water until the normal level of the water is attained, at which time the valve D is opened and the water will overflow through the outlet 22.

The sand and dirt from the incoming products of the well accumulates in the sand receptacle B from which it may be discharged at intervals through the pipe 28 and valve 29. As the incoming oil passes the baffles 6 and 7 gas may be incidentally liberated therefrom which will escape through sections 5, 9 and 12 to the vent pipe 15 and atmosphere.

Pressure in the tank forces oil from the upper portion of the tank outwardly through the vertical pipes 10 and 11 and 16 to the oil discharge line 17. An important feature of our separator consists in the provision of the means embodying pipes $a'$, 2, 2 for more effectively emulsifying the products of the well before their discharge into the tank, than would be otherwise possible. Such means insures the separation of the water, oil, sand and gas, so that the volume of oil in the tank will be substantially pure when discharged therefrom. Heating the contents of the tanks by the means shown and described, or otherwise, also enhances separation of the constituent elements of the well products.

It is believed that a comprehensive idea of the structure and operation of our improved separator is hereinbefore given and that a more detailed explanation is unnecessary.

We conceive it to be possible to modify the form of invention herein shown without departing from the spirit thereof or enlarging its scope beyond that of the appended claims.

What we claim, is:

1. An oil and water separator comprising a tank for receiving the products of the well, a plurality of vertically disposed pipes of gradually increasing height communicating with said tank, horizontal pipes connecting the vertical pipes at gradually increasing elevations, an inlet pipe connected with the lowermost pipe, an oil discharge pipe connected with the highest vertical pipe, and means at the junctures of the horizontal and vertical pipes for breaking up the volume of oil for releasing the gas therefrom.

2. An oil and water separator comprising a tank for receiving the products of a well and provided with an inlet, a plurality of vertically disposed pipes of gradually increasing height communicating with said tank and with said inlet and provided with an oil outlet, horizontal pipes connecting the vertical pipes at gradually increasing elevations, baffles at the junctures of the vertical and horizontal pipes, a water outlet to said tank below the normal oil level, and means controlled by the quantity of water in the tank for regulating the discharge of the water therefrom.

3. An oil and water separator comprising a tank for receiving the products of a well under pressure, a pressure feed line from the well to the tank, a plurality of standpipes connected with said tank and with said pressure lines and of different height for connection with an oil discharge pipe, horizontal pipes connecting said vertical pipes at gradually increasing elevations, a valve disposed below the volume of oil in the tank, a float submersible in oil but adapted to float on water, and means connecting said valve with said float for maintaining a substantially uniform volume of water in the tank below the volume of oil.

4. An oil and water separator comprising a tank for receiving the products of a well and provided with an inlet, a plurality of perforated parallel sections of pipe forming a nozzle for said inlet, a vertical standpipe communicating with said tank and connected with an oil discharge pipe, said tank adapted to hold water and oil from the well, a water outlet below the oil level, and means controlled by the level of water in the tank for opening and closing said water outlet.

5. An oil and water separator comprising a tank adapted to receive oil and water from a well, a pressure line connecting the tank with the well, an oil discharge pipe, a plurality of communicating vertical and horizontal pipes of different height interposed between the oil discharge pipe and the pressure line communicating with the tank, a water outlet, a valve connected with said water outlet and disposed below the oil level in the tank, and means within the tank and controlled by the level of water for opening and closing said valve.

6. An oil and water separator comprising a tank, means for delivering a liquid under pressure to the tank, means for atomizing the liquid discharged into the tank, a plurality of discharge pipes extended vertically from said tank, means in the tank for maintaining substantially uniform volumes of separate liquids of different specific gravity, means for heating the liquids so separated for liberating the volatile elements therefrom, and means for venting the volatile elements to the atmosphere.

7. A device of the character described comprising a tank arranged to receive the products of a well under pressure, separate oil and water outlets thereon, means in the tank for separating the oil and water, means for maintaining substantially uniform volumes of oil and water in the tank, a delivery nozzle and a receptacle mounted in said tank below said nozzle and arranged to receive and collect solid matter separated from the well products.

8. A device of the character described comprising a tank, a plurality of stand pipes of different heights communicating with said tank, means for cross connecting said pipes in pairs at different elevations, an inlet connected with the lowermost of said pipes, an oil outlet connected with the uppermost of said pipes, a gas outlet also connected therewith, a nozzle disposed within said tank and connected with said inlet, a receptacle mounted within said tank and encompassing said nozzle for draining the solid products of the well from the tank, a water outlet from said tank, and means controlled by the volumes of water and oil in the tank for regulating the opening and closing of said outlet.

WILLIAM M. LITTLE.
JESSIE L. SHERMAN.